United States Patent [19]

Bleazey et al.

[11] 4,053,161
[45] Oct. 11, 1977

[54] STYLUS ARM LIFTING/LOWERING APPARATUS FOR A VIDEO DISC PLAYER

[75] Inventors: John Clifford Bleazey, Trenton; Marvin Allan Leedom, Princeton, both of N.J.

[73] Assignee: RCA Corporation, New York, N.Y.

[21] Appl. No.: 667,309

[22] Filed: Mar. 16, 1976

[30] Foreign Application Priority Data

Sept. 15, 1975 United Kingdom ............... 37847/75

[51] Int. Cl.² .............................................. G11B 3/10
[52] U.S. Cl. ........................... 274/23 R; 179/100.1 B; 274/23 B; 358/128
[58] Field of Search ..................... 274/23 R, 23 A, 37, 274/38, 23 B; 178/6.6 R, 6.6 A, 6.6 DD; 358/128; 179/100.1 B

[56] References Cited

U.S. PATENT DOCUMENTS

| | | | |
|---|---|---|---|
| 3,272,514 | 9/1966 | Heyerdahl | 274/23 R |
| 3,952,145 | 4/1976 | Allen | 274/37 |

Primary Examiner—Steven L. Stephan
Attorney, Agent, or Firm—Eugene M. Whitacre; William H. Meagher; Dilip A. Kulkarni

[57] ABSTRACT

A video disc player includes a stylus arm carrying a stylus at one end thereof. The stylus is subject to engagement with a grooved record rotatably disposed on a turntable for playback. The other end of the stylus arm is pivotally secured within a stylus housing by a flexible coupler. The stylus housing is mounted for lateral motion relative to a base of said player between an off-record rest position and an over-record play position. A stylus arm rest is mounted within the stylus housing for motion between an elevated position and a depressed position. The stylus arm rest in the elevated position supports the stylus arm in a manner precluding stylus/record contact when the stylus housing is in the over-record play position. The stylus arm rest in the depressed position permits the stylus arm to occupy a lowered position. The lowered position of the stylus arm is such that the stylus/record contact is established when the stylus housing is in the over-record play position. The axis of the flexible coupler is aligned with the axis of the stylus arm when the stylus arm is in the lowered position, thereby relaxing the coupler. When the stylus housing moves from the over-record play position to the off-record rest position, a cam secured to the base engages a plunger linked to the stylus arm rest to cause motion of the stylus arm rest from the elevated position to the depressed position. When the stylus housing is in the over-record play position, an electromagnet mounted in the stylus housing is energized to repel a permanent magnet secured to the stylus arm rest to cause the stylus arm rest to assume the depressed position. The stylus arm rest is biased to occupy the elevated position in the absence of the cam/plunger engagement and the electromagnet energization.

8 Claims, 12 Drawing Figures

STYLUS ARM LIFTING/LOWERING APPARATUS FOR A VIDEO DISC PLAYER

The present invention relates to a video disc player, and, more particularly, relates to an apparatus suitable for use therein for lifting and lowering a stylus arm carrying a stylus.

In certain video disc systems, video information is recorded by means of geometric variations in the bottom of a smooth spiral groove on the surface of a record. The record surface includes a coating of conductive material which is preferably covered with a thin deposit of dielectric material. A stylus, supported at one end of a stylus arm, engages the record groove and includes an electrode which establishes a capacitance with the conductive coating and the dielectric deposit of the record. The other end of the stylus arm is secured to a support by a compliant member. When the record is rotated, the electrode/record capacitance varies in response to the geometric variations in the bottom of the record groove passing beneath the stylus. The capacitance variations are converted to electrical signal variations by a suitable signal processing circuitry coupled to the stylus electrode. The output signal of the signal processing circuitry may be coupled to a conventional television receiver for reproduction. A system of the aforementioned type is described in general in U.S. Pat. No. 3,842,194, issued on Oct. 15, 1974 to Jon K. Clemens.

Video disc systems of the aforementioned type generally utilize records having groove densities of the order of four to eight thousand groove convolutions per inch. A typical video record of this type may have a groove convolution spacing of the order of 3.5 microns. The fragile walls of relatively narrow record grooves cannot be dependably relied upon to pull the stylus arm assembly, around the compliant member, across the entire recorded surface of the record. Also, in video disc systems utilizing the above-mentioned variable capacitor concept, it is desirable for accurate reproduction of the prerecorded signals that the stylus electrode maintain a substantially constant attitude in the record groove. Therefore, a lateral feed drive mechanism is provided for traversing the stylus housing in proper time relationship with the lateral motion of the stylus due to the spiral groove so as to continuously maintain the longitudinal axis of the stylus arm substantially tangential to the spiral groove at the point of stylus/groove engagement during playback. Reference may be made to the U.S. Pat. No. 3,870,835, issued on Mar. 11, 1975 to Frederick R. Stave, for an illustration of a lateral feed drive mechanism.

In order to compensate for cyclical variations in the stylus/record relative speed, the location of the stylus in the record groove is varied by rendering the stylus arm support member subject to translatory motion along the longitudinal axis of the stylus arm in a manner that opposes the cyclical variations. Reference may be made to the U.S. Pat. No. 3,711,641, issued on Jan. 16, 1973 to Richard C. Palmer, for an illustration of a translatory motion imparting means.

In video disc systems of the aforementioned type, the groove engaging requirement and the translatory motion requirement for the stylus result in a stylus arm unit which is extremely fragile and light-weight, with illustrative dimensions, as follows: stylus arm outer diameter — 0.024 inches, stylus arm inner diameter — 0.020 inches (i.e., 0.002 inch thickness), stylus width — 2 microns, stylus depth — 5 microns, etc.

In video disc systems of the abovesaid type, it is advantageous to effect a smooth landing of the stylus on the record for playback, for example, for protecting the signal elements recorded in the groove bottom, the walls of the record groove, and the stylus.

For lowering of the stylus arm to establish stylus/record contact, one may utilize a conventional magnetic relay in conjunction with a movable iron core. To obtain a controlled acceleration of the movable iron core in such an arrangement, a device such as a dashpot is required which increases the mass of the moving system. Such an arrangement is undesirable because of added cost, power consumption, etc.

In a copending U.S. patent application of R. DeStephanis, Ser. No. 667,387, entitled "STYLUS ARM LIFTING/LOWERING APPARATUS FOR A VIDEO DISC PLAYER SYSTEM", and filed concurrently herewith an electromagent apparatus which overcomes the abovementioned problems is disclosed. The present invention provides improvements in lifting/lowering apparatus of the electromagnetic type disclosed in said DeStephanis application.

Further, in a system of the abovesaid type, the compliant member secured to the stylus arm has a tendency to form a "set" when it is held in a stressed condition for a period of time. The formation of the "set" is undesirable because it interferes with the ability of the stylus to track the record groove during playback.

Accordingly, it is desirable that the average position about which the compliant member moves during playback involves a substantially unstressed condition for the compliant member. For this purpose, the axes of the stylus arm and the compliant member are desirably disposed in substantial alignment when the stylus arm is in a lowered position for playback.

An apparatus pursuant to the principles of the present invention, in addition to obtaining a smooth landing of the stylus on the record for playback, disposes the stylus arm in a lowered position when the stylus housing is in an off-record rest position to permit stylus arm/compliant member alignment under sustained rest conditions. Thus the compliant member may be maintained in an unstressed condition when the stylus housing is in the off-record rest position, as well as when the stylus arm is lowered for playback. With this accomplished, maintenance of the compliant member in a stressed condition may be confined to transition periods, as, for example, when the stylus arm is raised to clear the bead of the record, as the stylus housing moves from the off-record rest position to the above-record play position, and vice versa.

In accordance with the principles of the present invention, a stylus arm rest is mounted in the stylus housing for motion between an elevated position and a depressed position. The stylus arm rest in the elevated position supports the stylus arm in a raised position. The raised position of the stylus arm precludes stylus/record contact when the stylus housing is in an above-record play position. The stylus arm rest in the depressed position permits the stylus arm to occupy a lowered position. When the stylus arm is in the lowered position, the stylus arm is aligned with a compliant member which pivotally secures the end of the stylus arm remote from the stylus-carrying end within the stylus housing. The lowered position of the stylus arm establishes stylus/record contact when the stylus housing is in the above-record play position. Actuating means, responsive to the motion of the stylus housing from the above-record play position to an off-record rest position, cause the stylus arm rest to assume the depressed position when the stylus housing is in the off-record rest position. Energizing means dispose the stylus arm rest in the depressed position to establish stylus/record contact for playback when the stylus housing is in an above-record play position. The stylus arm rest occupies the elevated position when the actuating and energizing means are inoperative.

In accordance with a further feature of the invention, the energization provided by the energizing means is controlled to adjust the stylus arm lowering rate for obtaining a gradual landing of the stylus on the record for playback.

In the accompanying drawings in which like reference numerals designate similar elements in various views:

FIG. 2 a illustrates a stylus arm unit included in the video disc player of FIG. 1;

FIG. 2 b illustrates a clamping spring for retractably clamping the stylus arm unit of FIG. 2 a in a cartridge;

Figure 1:
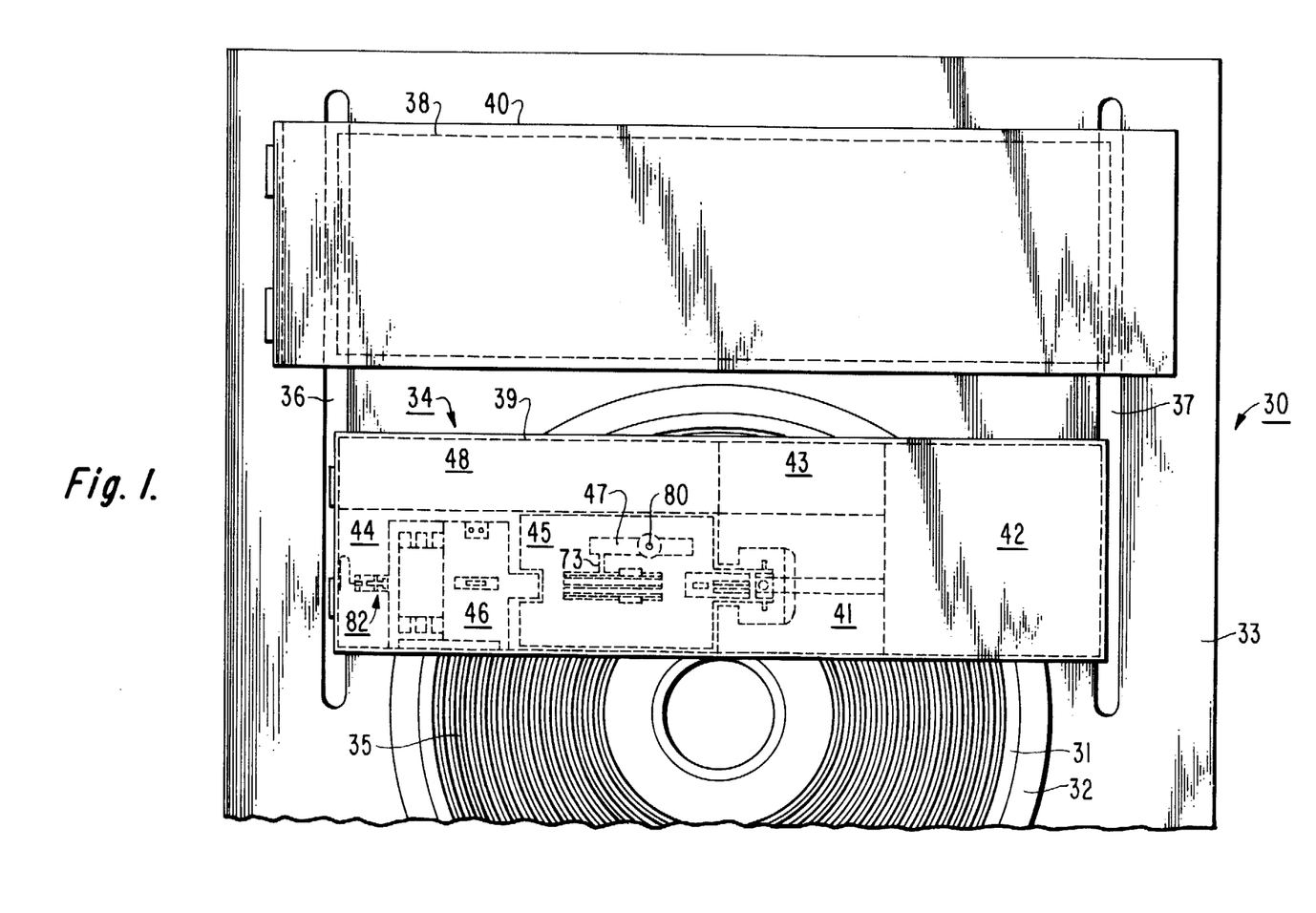
FIG. 1 is a plan view of a video disc player incorporating an apparatus for lifting and lowering a stylus arm carrying a stylus pursuant to the principles of the present invention.
Figures 2A, 2B:
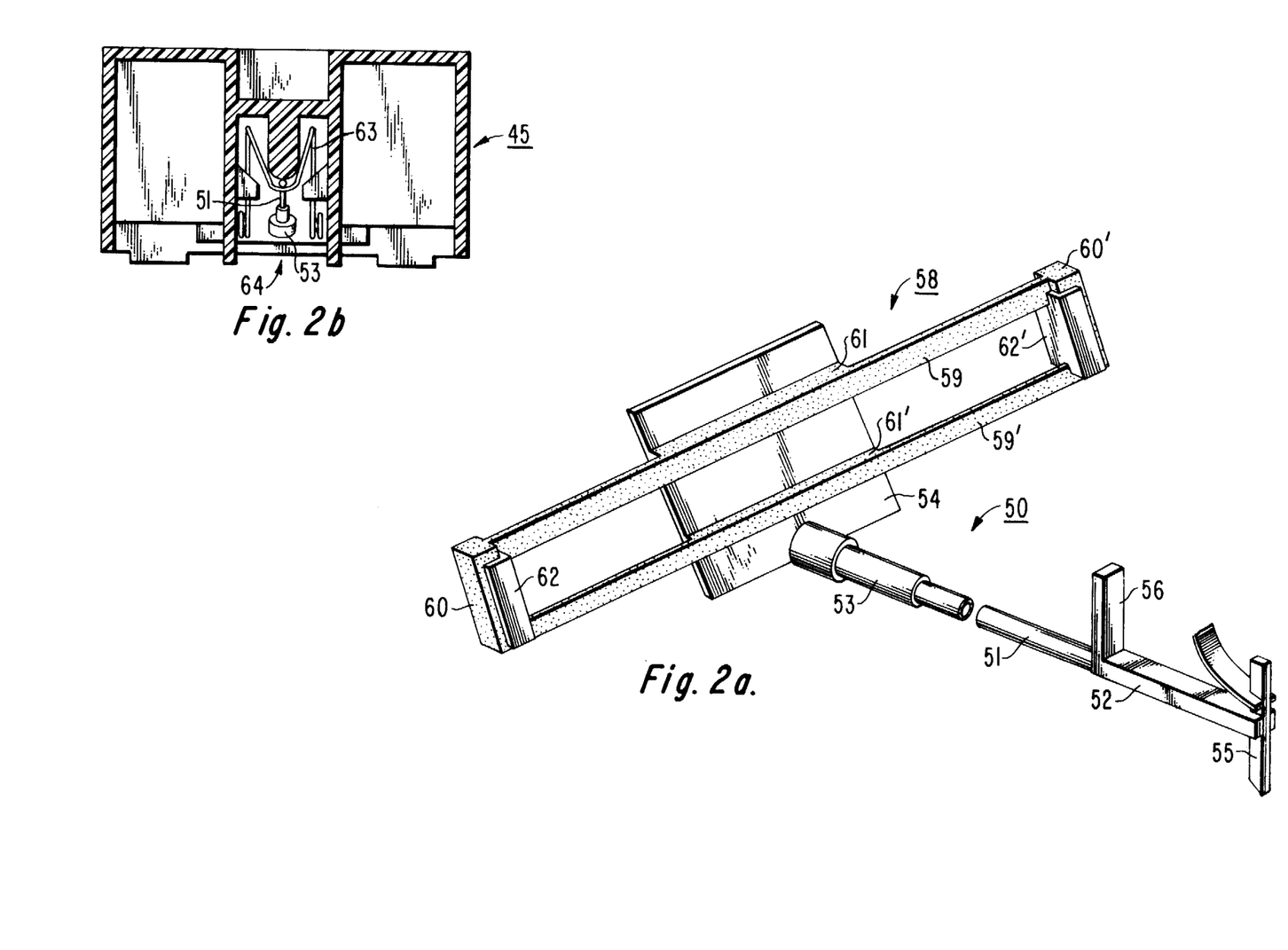

In FIG. 1, numeral 30 indicates a video disc system of the general type shown in the U.S. Pat. No. 3,842,194 (Clemens). A record 31 is disposed for playback on a turntable 32 rotatably mounted on a motorboard 33. A stylus housing 34 is mounted for lateral motion relative to the motorboard 33 in correlation with lateral motion of a stylus 55 (FIG. 2) riding in a spiral-groove 35 disposed on the surface of the record 31 during playback. Slots 36 and 37 are provided in the motorboard 33 to permit lateral motion of the stylus housing 34 from an off-record rest position 38 to an above-record play position 39. Reference may be made to the U.S. Pat. No. 3,870,835 (Stave) for illustration of an apparatus for laterally driving the stylus housing 34 in correlation with the groove-riding stylus 55 during playback. When the stylus housing 34 is in the off-record rest position 38, a hinged plate 40 conceals the stylus housing.

There are five basic chambers in the stylus housing 34. Chambers 41, 42 and 43 are for enclosing respective circuit boards for respective elements of the signal processing circuitry of the playback system: (a) resonantor (forming a tuned circuit with the stylus electrode/record capacitance); (b) oscillator (supplying UHF oscillations to the tuned circuit); and (c) preamplifier (responding to the detected version of modulated oscillations derived from the tuned circuit). Chamber 44 contains a replaceable stylus arm cartridge 45, a retractable armstretcher 46, and a stylus arm lifting/lowering apparatus 47. The armstretcher may be of the type shown in U.S. Pat. No. 3,711,641 (Palmer). Chamber 48 forms a wiring channel to hold the lead wires to the various circuit boards.

The cartridge 45 houses an insert molded stylus arm unit 50 shown in FIG. 2. The insert molded stylus arm unit 50 consists of a stylus arm 51 formed of an aluminum tube (e.g., 0.024 inch outer diameter and 0.002 inch thickness) with a plastic stylus holder 52 molded at one end of the stylus arm and a compliant member 53 molded at the other end of the stylus arm to connect the stylus arm with a metal connector plate 54. The compliant member 53 is in unstressed condition when it is aligned with the stylus arm 51. The angle between the stylus arm 51 and the connector plate 54 is 94° for reasons given subsequently. The plastic stylus holder 52 contains a slot to hold the stylus 55 when it is glued in place. A small projection 56 is molded at the top of the plastic stylus holder 52 to engage with a "stonewall" 57 (FIG. 3) to relieve the stylus 55 from a locked groove. Reference may be made to the U.S. patent application Ser. No. 562,730 (Taylor) , and now U.S. Pat. No. 3,961,131, for an example of a locked groove escape arrangement.

The arrangement for suspending the stylus arm unit 50 in the cartridge 45 will now be explained.

As shown in FIG. 2 a, an elastic diaphragm 58 is glued to the connector plate 54 of the stylus arm unit 50. The diaphragm 58 comprises a pair of elastic straps 59 and 59' joining end ribs 60 and 60'. The elastic straps 58 and 59 have central projections 61 and 61' of appropriate wedge shapes providing slanted near surfaces to which the connector plate 54 is glued. The slant rear surfaces establish and 8° angle between the connector plate 54 and the forward surfaces of the elastic straps 59 and 59' for reasons given subsequently.

A pair of hooks 62 and 62' are molded into the rear end of the cartridge 45. In order to secure the diaphragm 58 to the cartridge 45 the end ribs 60 and 60' are stretched apart and drawn over the hooks 62 and 62'. The hooks 62 and 62' have slots for seating the end ribs 60 and 60' and slots for seating the elastic strap 59 and 59'. When the diaphragm 58 is properly secured to the cartridge 45, the aforesaid slots establish an angular orientation of the front surfaces of the elastic straps with respect to the cartridge 45 (i.e., perpendicular to the bottom surface of the cartridge body).

Figure 10:
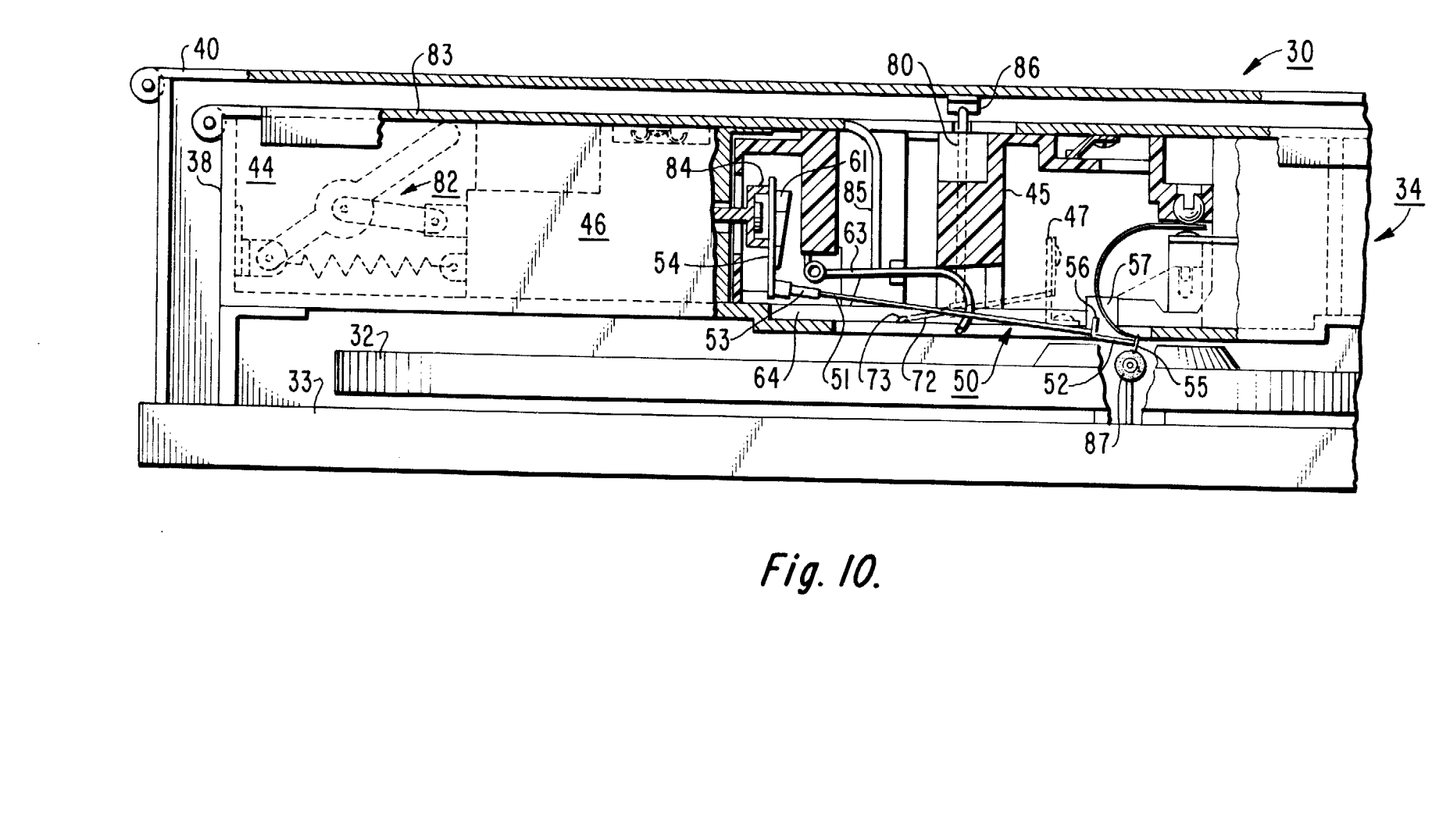
Figure 11:
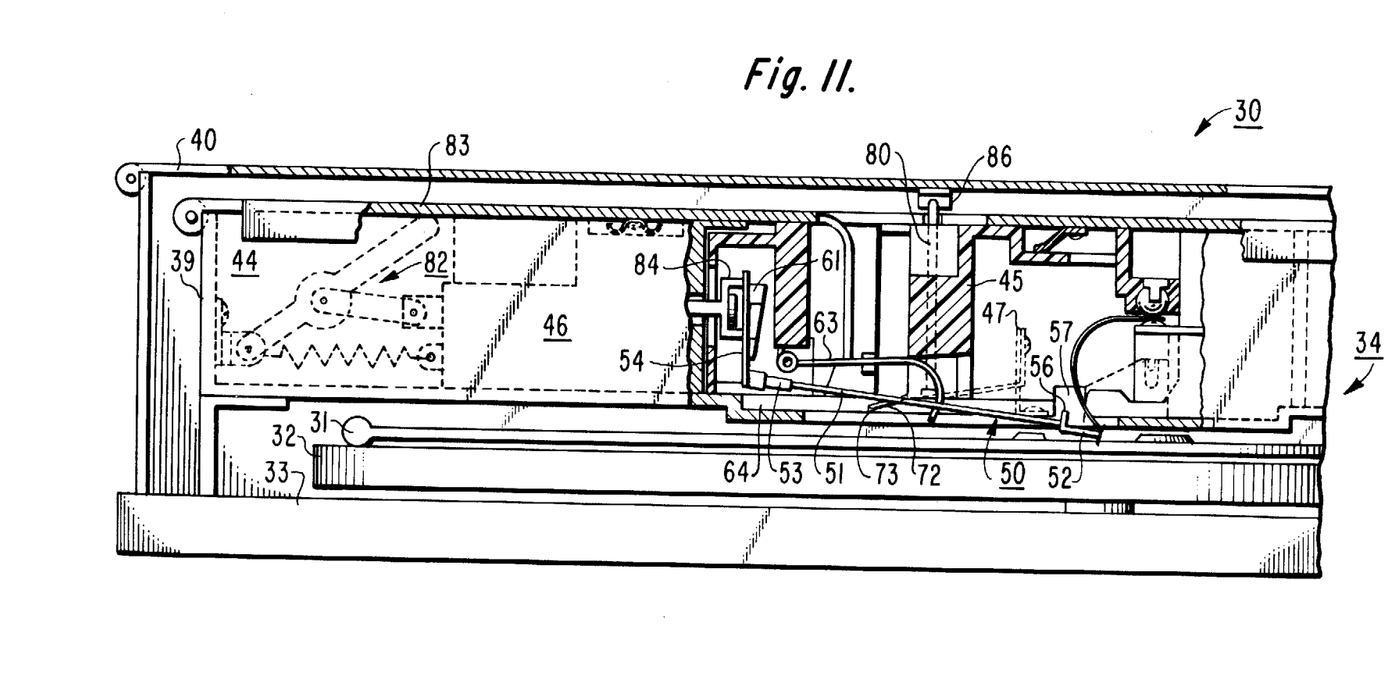

A U-shaped spring 63 releasably clamps the stylus carrying end of the stylus arm 51 in a retracted position in the cartridge 45, as shown in FIG. 2b, during storage and handling of the cartridge (i.e., outside the player compartment). The retracted position provides a location for the stylus 55 withdrawn within the confines of the cartridge 45, remote from an opening 64 in the cartridge through which the stylus protrudes when the stylus housing 34 is in the off-record rest position 38 (FIG. 10) and the above-record play position 39 (FIG. 11).

An angular orientation of the front surfaces of the elastic straps 59 and 59' relative to the cartridge 45 (e.g., perpendicular to the bottom surface of the cartridge), the angular orientation of the connector plate 54 relative to the front surfaces of the elastic straps (e.g., 8°) and the angular orientation of the compliant member 53 relative to the connector plate (e.g., 94°) is such that, when the stylus arm 51 is held in a retracted position in the cartridge, the compliant member is axially aligned (i.e., relaxed because not bent) with the stylus arm although the stylus arm is well up into the cartridge for protection. Axial alignment of the compliant member 53 with the stylus arm 51 during retention in the retracted position is advantageous because it prevents formation of a "set" in the compliant member during storage and handling of the cartridge 45.

Figure 3:
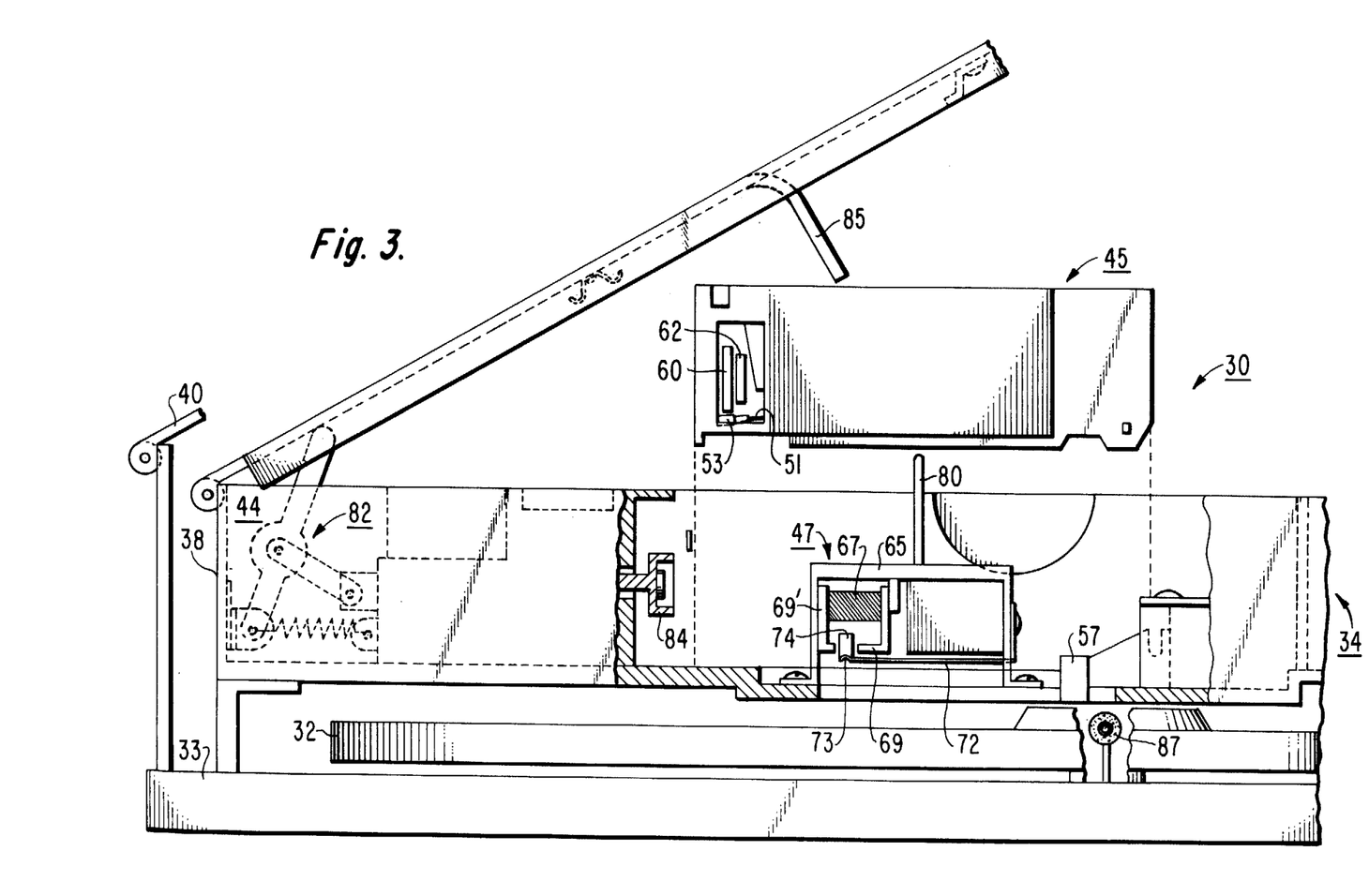
FIG. 3 is a side view of the player of FIG. 1; a portion of the stylus housing of the player being removed to expose the stylus arm lifting/lowering apparatus of FIG. 1; the cartrdige enclosing the stylus arm unit of FIG. 2 being shown outside the stylus housing.

FIG. 3 illustrates the side view of the video disc player 30. A portion of the stylus housing 34 is broken away to show the stylus arm lifting/lowering apparatus mounted in the stylus housing compartment 44. The cartridge 45 is shown outside the stylus housing compartment 44.

Figure 4:
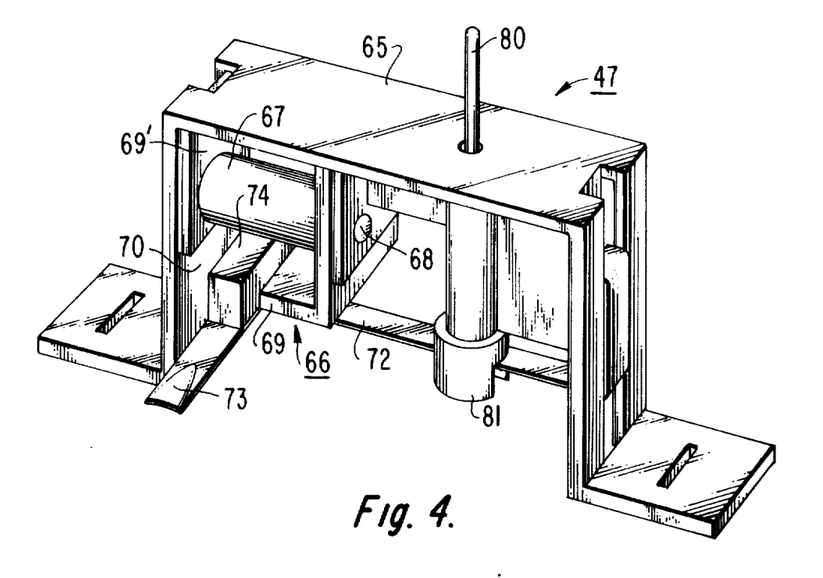
FIG. 4 is a perspective view of the stylus arm lifting/lowering apparatus of FIGS. 1 and 3.
Figure 5:
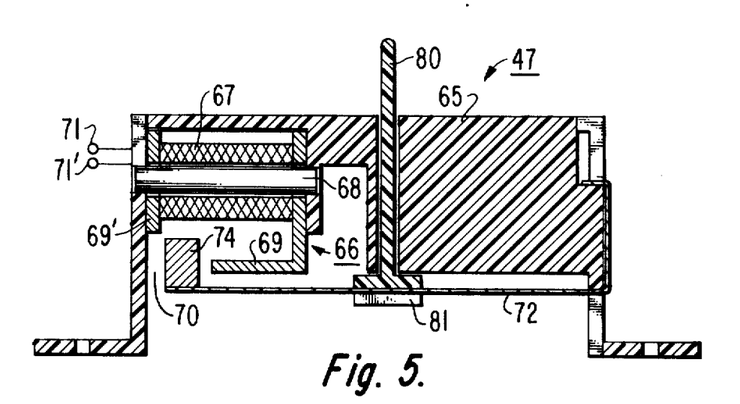
FIG. 5 is a cross sectional view of the stylus arm lifting/lowering apparatus of FIGS. 1, 3 and 4.

The stylus arm lifting/lowering apparatus 47 of the present invention will not be described. FIG. 4 illustrates the perspective view and FIG. 5 illustrates a cross section of the stylus arm lifting/lowering apparatus 47. The apparatus includes a support structure 65 which is mounted within the stylus housing compartment 44 as shown in FIG. 3. An electromagent 66 is secured to the structure 65. The electromagnet 66 comprises a coil 67 wound about a magnetizable core 68. The magnetizable core 68 includes a pair of pole pieces 69 and 69' which define an air gap 70. The ends of the coil 67 are connected to a pair of terminals 71 and 71' (FIG. 5).

Figure 9:
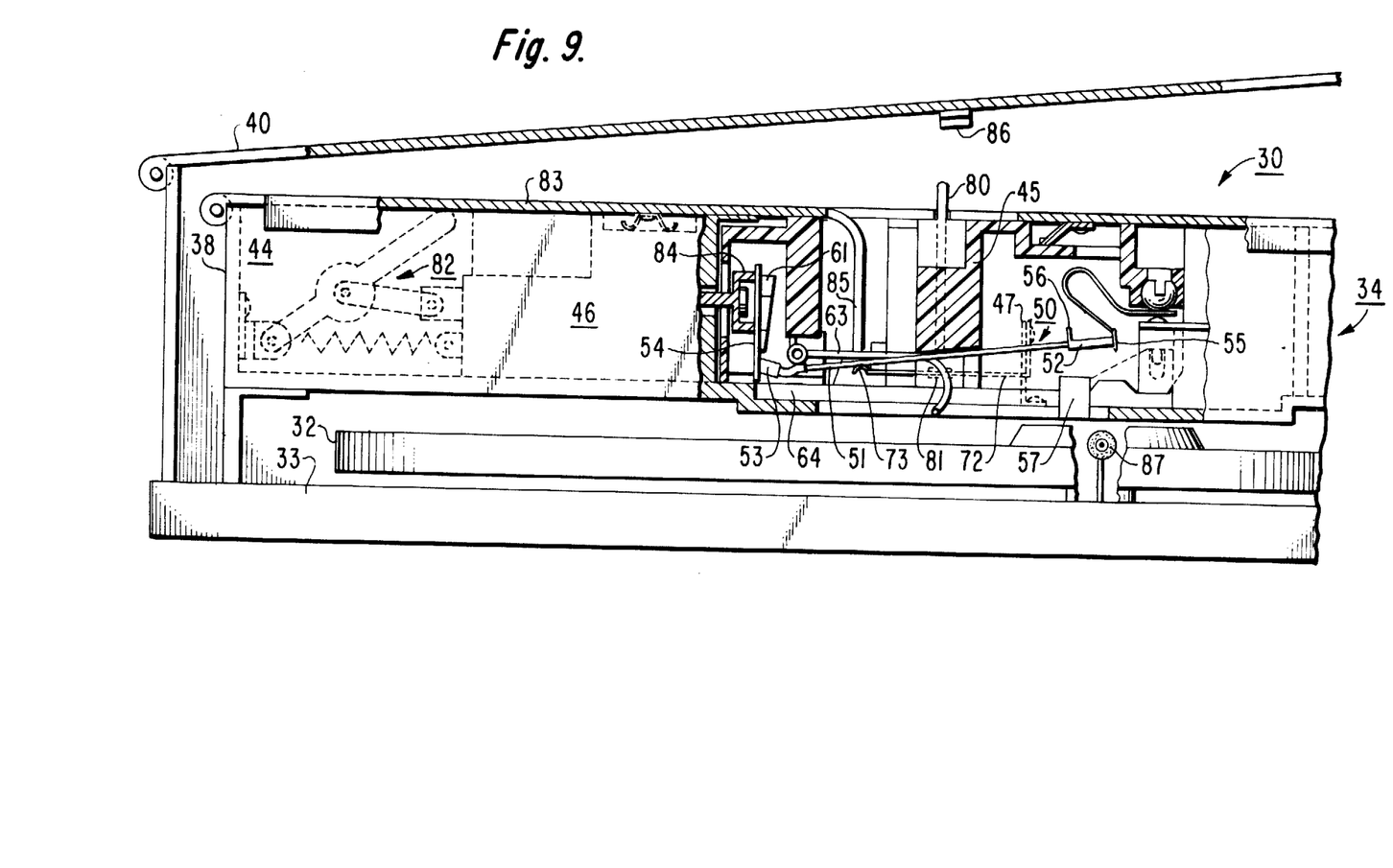

One end of a leaf spring 72 is secured to the structure 65. The free end of the leaf spring 72 carries a stylus arm rest 73. The leaf spring 72 permits motion of the stylus arm rest 73 between an elevated position (FIG. 9) and a depressed position (FIGS. 10–11). The stylus arm 73 in the elevated position supports the stylus arm 51 in a raised position (FIG. 9). The raised position of the stylus arm 51 precludes stylus/record contact when the stylus housing 34 is in the above-record play position 39.

The stylus arm rest 73 in the depressed position permits the stylus arm 51 to occupy a lowered position (FIGS. 10–11). The lowered position of the stylus arm establishes stylus/record contact when the stylus housing 34 is in the above-record play position 39.

Further, the angle between the compliant member 53 and the connector plate 54, during containment of the cartridge 45 in the stylus housing compartment 44, is such that when the stylus arm 51 is in the lowered position, the compliant member is aligned with the stylus arm (and hence the compliant member is relieved).

A permanent magnet 74 is secured to the stylus arm rest 73 such that when the stylus arm rest is in the elevated position the permanent magnet is in close proximity to the air gap 70.

Figure 7:
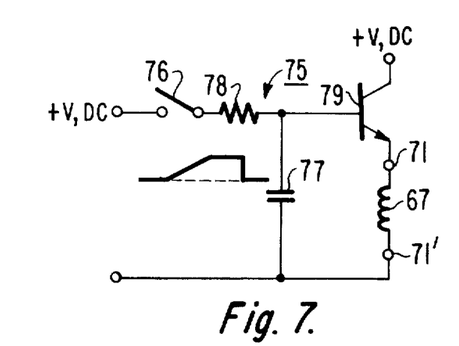
FIG. 7 is a selectively operated circuit for providing a controlled excitation of the electromagent included in the stylus arm lifting/lowering apparatus of FIGS. 1, 3 and 4.

A circuit 75, shown in FIG. 7, supplies a ramp voltage across the terminals 71 and 71' of the coil 67. The ramp voltage across the terminals 71 and 71' causes a controlled current of a given polarity to flow through the coil 67. The controlled current in the coil 67 establishes electromagnetic flux gradient in the air gap 70.

The orientation of the permanent magent 74 relative to the gap 70 is such that the permanent magent is repelled away from the gap in the presence of the controlled current of the given polarity in the coil 67. The electromagnetic repulsion of the permanent magent 74 out of the air gap causes the stylus arm rest 73 to assume the depressed position (FIGS. 10 and 11).

When a switch 76 is closed, a capacitor 77 is charged through a resistor 78 to the DC supply voltage in the circuit 75 of FIG. 7. The time constant of the RC circuit determines the rate of increase of voltage across the coil 67. The rate of increase of voltage across the coil 67, in turn, determines the rate at which the stylus arm rest 73 carrying the stylus arm 51 is lowered. By proper selection of the time constant of the RC circuit, a gentle set down of the stylus 55 on the record 31 for playback can be assured.

In the circuit 75 of FIG. 7, a transistor 79 is used as an impedance matching device to match the high impedance of the RC network to the low impedance of the coil 67 in the electromagnet.

Figure 6:
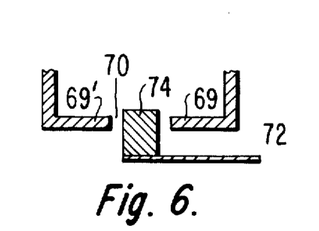
FIG. 6 illustrates an alternative form for an electromagnet included in the stylus arm lifting/lowering apparatus of FIGS. 1, 3 and 4.

To assure that the permanent magnet 74 is repelled downward from the electromagnet 66 upon the energization of the given polarity, the center of the air gap 70 is elevated with respect to the location of the permanent magnet 74, when the stylus arm rest is in the elevated position, as in the air gap arrangement shown in FIG. 5, or the alternative air gap arrangment shown in FIG. 6.

As shown in FIGS. 4–5, a plunger 80 is reciprocably mounted in the support structure 65. A base 81 of the plunger 80 rests on the leaf spring 72, for reasons stated subsequently.

Figure 8:
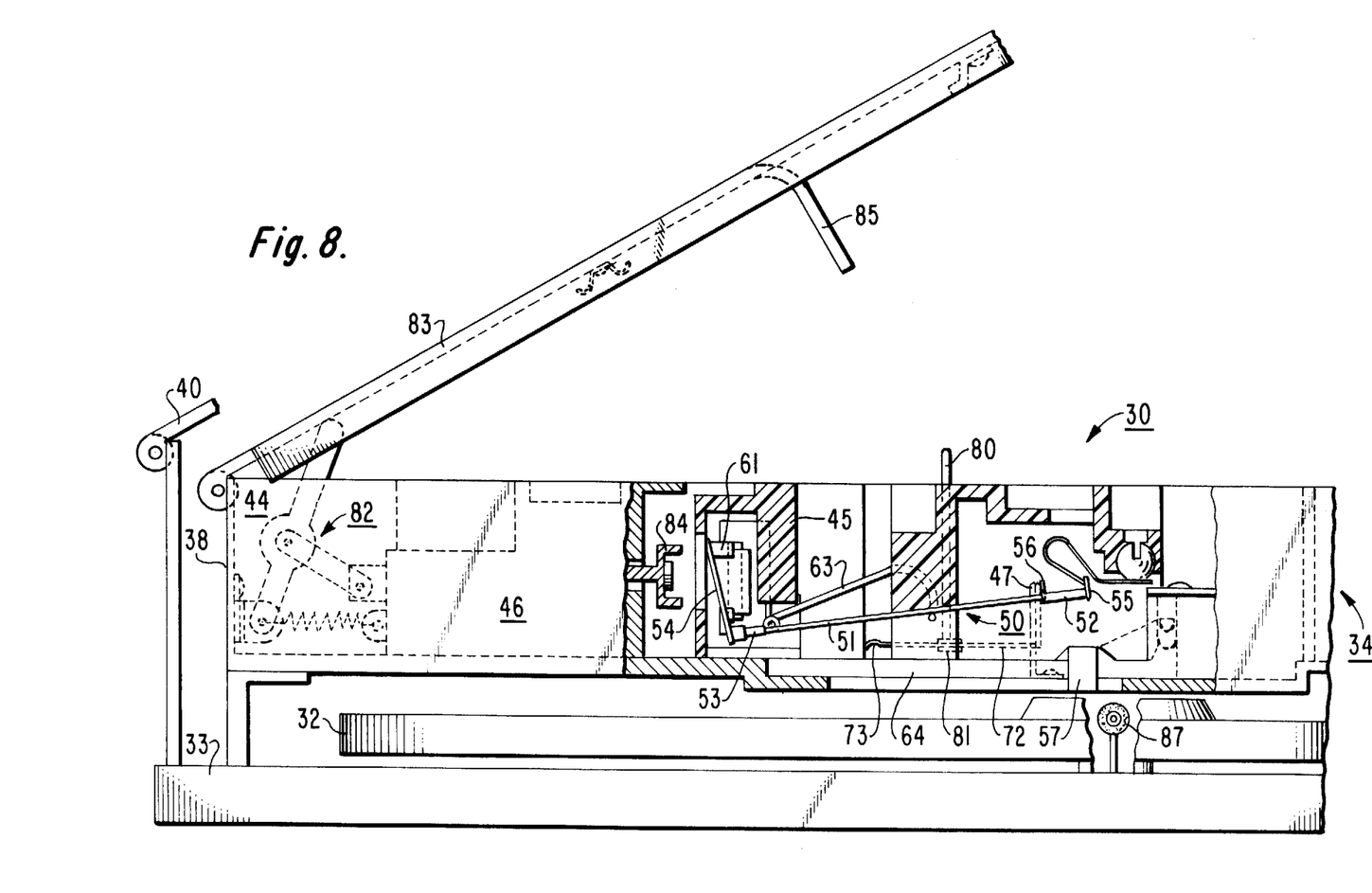
FIGS. 8-11 illustrate, a seriatim, operation of the stylus arm lifting/lowering apparatus of FIGS. 1, 3 and 4.

FIGS. 8–11 illustrate the sequence of operations. As shown in FIG. 8, a linkage 82 moves the armstretcher 46 toward the cartridge 45 in response to the motion of a lid 83 of the stylus housing 34. The armstretcher 46 causes a cyclical movement of a support member 84 to serve the above noted velocity correction purposes.

When the stylus housing lid 83 is closed, as shown in FIG. 9, (1) the support member 84 rigidly engages the connector plate 54' for transmitting the cyclical motion to the stylus 55; and (2) a defeat lever 85, secured to stylus housing lid 83, depresses the clamping spring 63 to allow the stylus arm 51 to rest on the stylus arm rest 73.

When the hinged plate 40 is closed, as shown in FIG. 10, a cam member 86, secured to the hinged plate, depresses the plunger 80 to cause the stylus arm rest 73 to assume the depressed position. When the stylus housing 34 is in the off-record rest position 38, the depression of the plunger 80 disposes the stylus arm 51 in the lowered position with the free end of the stylus arm being supported by the stylus 55 resting on a stylus brush 87.

When the stylus housing 34 moves from the off-record rest position 38 (FIG. 10) to the above-record play position 39 (FIG. 11), moving plunger 80 away from the vicinity of cam member 86, the leaf spring 72 lifts the stylus arm rest 73 to the elevated position, allowing the stylus 55 to clear the outer bead of the record 31, as the depression of the plunger 80 is no longer maintained by the cam member 86.

When the stylus housing 34 reaches a desired above-record play position 39, closing of switch 76 in the circuit 75 of FIG. 7 energizes the electromagnet 66 to repel the permanent magnet 74 in a manner that causes the stylus arm rest 73 to assume the depressed position as shown in FIG. 11. When the stylus housing 34 is in the above-record play position, the repulsion of the permanent magnet 74 disposes the stylus arm 51 in the lowered position establishing stylus/record contact for playback.

Upon playback completion, an opening of switch 76 effects a rapid decrease in the energization of the electromagnet 66, and a consequent lifting of arm rest 73 by spring 72. As stylus housing 34 returns to its rest position 38, however, engagement of cam member 86 by plunger 80 causes plunger 80 to depress arm rest 72, returning arm 51 to its lowered position.

This stylus arm lifting/lowering system has a number of advantages:

1. The rate of lowering the stylus arm to the record is controlled electrically and can easily be varied.
2. The mechanism is such that the stylus arm can be placed in the "play" attitude when the video disc player is "off". This allows the stylus arm to rest in a normal unstressed position so that rubber molded parts on the stylus arm do not take a permanent set during long idle periods.
3. The device uses an efficient magnetic circuit so that only small current and power are required for operation.
4. This device is small and compact for convenient fitting in the player's stylus housing.

What is claimed is:

1. In a playback system for recovering prerecorded information from a spirally grooved record disposed on a turntable rotatably mounted with respect to a base of said system; said system including a stylus arm carriage mounted for lateral motion with respect to said base between and off record rest position and an above-record play position; a groove riding stylus secured to one end of a stylus arm; the end of said stylus arm remote from said one end being secured to a support member mounted within said carriage via a compliant coupler; said securing of said compliant coupler to said support member being such that the axes of said compliant coupler and said stylus arm are aligned when said stylus arm is occupying a lowered position; said compliant coupler being in a substantially unstressed condition when the axes of said compliant coupler and said stylus arm are aligned; said lowered position of said stylus arm establishing stylus/record contact for playback when said carriage is in said above-record play position; an apparatus comprising:
   1. a stylus arm rest mounted in said carriage for motion between an elevated position and a depressed position;
      said stylus arm rest in said elevated position supporting said stylus arm in a raised position; said raised position of said stylus arm being such that said stylus/record contact is precluded when said carriage is in said above-record play position;
      said stylus arm rest in said depressed position permitting said stylus arm to occupy said lowered position;
   2. selectively actuated means mounted within said carriage for causing motion of said stylus arm rest between said elevated and depressed positions;
   3. actuating means subject to engagement with said selectively actuated means, and responsive to motion of said carriage from said above-record play position to said off-record rest position, for causing said stylus arm rest to assume said depressed position when said carriage is in said off-record rest position;
   4. selectively energized means mounted within said carriage for causing motion of said stylus arm rest between said elevated and depressed positions;
   5. means for selectively energizing said selectively energized means when said carriage is in said above-record play position to establish said stylus/-record contact for playback; and
   6. means for causing said stylus arm rest to occupy said elevated position in the absence of said engagement and said energization.

2. An apparatus as defined in claim 1 wherein said selectively energized means includes a stationary element mounted within said carriage; said stationary element including means for generating magnetic flux; said selectively energized means further including a permanent magnet fixedly secured to said stylus arm rest; the location of said permanent magnet being such that said permanent magnet is positioned in close proximity to said magnetic flux generating means when said stylus arm rest is in said elevated position;
   said energizing means serving to provide a given polarity of energization of said magnetic flux generating means; the orientation of said permanent magnet relative to said magnetic flux generating means being such that said permanent magnet is repelled away from said magnetic flux generating means during said energization of said given polarity to cause motion of said stylus arm rest from said elevated position to said depressed position.

3. An apparatus as defined in claim 2 wherein said magnetic flux generating means comprises a coil wound about a magnetizable core; said energizing means being effective to cause a controlled current to flow through said coil to provide said energization of said given polarity; said magnetizable core having a pole piece; said location of said stationary element being such that a pole of said permanent magnet is situated in close proximity to said pole piece when said stylus arm rest is in said elevated location; the polarity of said pole of said permanent magnet being the same as the polarity of said pole piece in the presence of said controlled current in said coil to effect said repulsion of said permanent magnet.

4. An apparatus as defined in claim 3 wherein said magnetizable core has a pair of pole pieces defining an air gap; said location of said stationary element serving to position said permanent magnet in close proximity to said air gap when said stylus arm rest is in said elevated position; the orientation of said permanent magnet relative to said pole pieces being such that each pole of said permanent magnet is situated adjacent to a pole piece having the same polarity in the presence of said controlled current in said coil to effect said repulsion of said permanent magnet.

5. An apparatus as defined in claim 4 wherein said stylus arm rest elevated position causing means comprises a leaf spring; one end of said leaf spring being secured to said carriage; said stylus arm rest being secured to the other end of said leaf spring; said leaf spring serving to bias said stylus arm rest to assume said elevated position in the absence of said engagement and said energization.

6. An apparatus as defined in claim 5 wherein said selectively actuated means includes a plunger reciprocably mounted within said carriage; one end of said plunger being secured to said leaf spring;
   said actuating means comprising a depressing member fixedly secured to said base; the location of said depressing member being such that when said carriage moves from said above-record play position to said off-record rest position, said depressing member engages said plunger to cause motion of said leaf spring in a manner that moves said stylus arm rest from said elevated position to said depressed position.

7. In a playback system for recovering prerecorded signals from a spirally grooved record disposed on a turntable rotatably mounted with respect to a base of said system; said system including a support member; a stylus arm, carrying a groove-riding stylus at one end, being pivotally secured at the other end to said support member; an apparatus comprising:
1. a leaf spring; one end of said leaf spring being secured to said support member;
2. a stylus arm rest secured to the other end of said leaf spring, and subject to motion between an elevated position supporting said stylus arm in a raised position, and a depressed position permitting said stylus arm to occupy a lowered position; said leaf spring biasing said stylus arm rest toward said elevated position;
    said raised position of said stylus arm being such that stylus/record contact is precluded;
    said lowered position of said stylus arm establishing said stylus/record contact when said stylus overlies said record for playback;
3. a magnetic flux generating means secured to said support member; said magnetic flux generating means comprising a coil wound about a magnetizable core; said magnetizable core having a pair of pole pieces defining a gap;
4. a permanent magnet secured to said stylus arm rest in such a manner that said permenent magnet is located in close proximity to said gap when said stylus arm rest is in said elevated position; and
5. energizing means for selectively causing a unidirectional controlled current to flow through said coil to provide a given polarity of energization of said gap;
    the orientation of said permenent magnet relative to said gap being such that said permenent magnet is repelled away from said gap during said energization of said given polarity to cause motion of said stylus arm rest from said elevated position to said depressed position.

8. In a playback system for recovering prerecorded information from a spirally grooved record disposed on a turntable rotatably mounted with respect to a base of said system; said system including a stylus arm carriage mounted for lateral motion with respect to said base between an off-record rest position and an above-record play position; a groove riding stylus secured to one end of a stylus arm; the end of said stylus arm remote from said one end being secured to a support member mounted within said carriage via a compliant coupler; said securing of said compliant coupler to said support member being such that the axes of said compliant coupler and said stylus arm are aligned when said stylus arm is occupying a lowered position; said compliant coupler being in a substantially unstressed condition when the axes of said compliant coupler and said stylus arm are aligned; said lowered position of said stylus arm establishing stylus/record contact for playback when said carriage is in said above-record play position; an apparatus comprising:
1. a stylus arm rest mounted in said carriage for motion between an elevated position and a depressed position;
    said stylus arm rest in said elevated position supporting said stylus arm in a raised position; said raised position of said stylus arm being such that said stylus/record contact is precluded when said carriage is in said above-record play position;
    said stylus arm rest in said depressed position permitting said stylus arm to occupy said lowered position;
2. means, responsive to arrival of said carriage at said off-record rest position, for causing said stylus arm rest to assume said depressed position;
3. selectively energized means mounted within said carriage for causing motion of said stylus arm rest between said elevated and depressed postions;
4. means for selectively energizing said selectively energized means when said carriage is in said above-record play position to establish said stylus/record contact for playback; and
5. means for causing said stylus arm rest to occupy said elevated position in the absence of said energization and said arrival at said off-record rest position.

* * * * *